(12) United States Patent
Chism et al.

(10) Patent No.: US 10,909,181 B2
(45) Date of Patent: Feb. 2, 2021

(54) PEOPLE RELEVANCE PLATFORM

(71) Applicant: Microsoft Technology Licensing, LLC, Redmond, WA (US)

(72) Inventors: Shane M. Chism, Bellevue, WA (US); Brenda W. Bell, Bellevue, WA (US); Bernabe Hostein, Bellevue, WA (US); Hari Bharath Molabanti, Bellevue, WA (US); Aravind Narayanan Manimandiram, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 518 days.

(21) Appl. No.: 15/405,524

(22) Filed: Jan. 13, 2017

(65) Prior Publication Data
US 2017/0277810 A1 Sep. 28, 2017

Related U.S. Application Data

(60) Provisional application No. 62/314,383, filed on Mar. 28, 2016.

(51) Int. Cl.
*G06F 17/00* (2019.01)
*G06F 16/903* (2019.01)
(Continued)

(52) U.S. Cl.
CPC ...... *G06F 16/90335* (2019.01); *G06F 16/335* (2019.01); *G06N 20/00* (2019.01); *G06Q 10/107* (2013.01); *G06Q 50/01* (2013.01)

(58) Field of Classification Search
CPC . G06F 16/90335; G06F 16/335; G06N 20/00; G06Q 10/107; G06Q 50/01
See application file for complete search history.

(56) References Cited

U.S. PATENT DOCUMENTS 8,112,437 B1 * 2/2012 Katragadda ............ G06Q 10/10
707/767
8,392,836 B1 3/2013 Bau et al.
(Continued)

FOREIGN PATENT DOCUMENTS

EP 1338967 8/2003
WO 2015109249 A1 7/2015

OTHER PUBLICATIONS

PCT International Search Report and Written Opinion in PCT/US2017/023690, dated Jun. 23, 2017, 12 pages.
(Continued)

*Primary Examiner* — Tyler J Torgrimson
(74) *Attorney, Agent, or Firm* — Merchant & Gould P.C.

(57) ABSTRACT

Examples of the present disclosure describe systems and methods of providing a people relevance platform. In aspects, an event may be generated by an application/service on a client device. The event may be transmitted to a people relevance platform. The people relevance platform may use the event to query one or more data sources for user contacts associated with the user. The people relevance platform may generate/modify a graph or model using the user contact data, and may provide the user contact data to the client device. The client device may update a local cache and provide the user contact data to the originating application. The client device may monitor the user selection of a contact, and transmit the selection information to the people relevance platform. The people relevance platform may modify the graph and/or model based on the selection information.

20 Claims, 8 Drawing Sheets

(51) Int. Cl.
*G06N 20/00* (2019.01)
*G06Q 10/10* (2012.01)
*G06F 16/335* (2019.01)
*G06Q 50/00* (2012.01)

(56) References Cited

U.S. PATENT DOCUMENTS

| | | | |
|---|---|---|---|
| 8,583,139 B2 | 11/2013 | Jung et al. | |
| 9,230,240 B2 | 1/2016 | Iwasaki et al. | |
| 2005/0076013 A1 | 4/2005 | Hilbert et al. | |
| 2005/0132005 A1* | 6/2005 | Horvitz | G06Q 10/109 709/204 |
| 2006/0035632 A1* | 2/2006 | Sorvari | H04M 1/271 455/418 |
| 2006/0245641 A1* | 11/2006 | Viola | G06F 40/295 382/155 |
| 2008/0016101 A1* | 1/2008 | Ginsburg | G06F 16/951 |
| 2011/0209159 A1* | 8/2011 | Baratz | G06F 16/24575 718/108 |
| 2012/0042036 A1 | 2/2012 | Lau et al. | |
| 2012/0209839 A1 | 8/2012 | Andrews et al. | |
| 2012/0226704 A1 | 9/2012 | Boland et al. | |
| 2012/0278078 A1 | 11/2012 | Ricci et al. | |
| 2013/0198297 A1* | 8/2013 | Saabas | G06Q 10/1095 709/206 |
| 2013/0346347 A1* | 12/2013 | Patterson | G06N 20/00 706/12 |
| 2014/0011481 A1* | 1/2014 | Kho | H04W 4/02 455/414.1 |
| 2014/0066044 A1* | 3/2014 | Ramnani | H04L 67/306 455/418 |
| 2014/0156650 A1* | 6/2014 | Jacobson | G06Q 10/10 707/723 |
| 2014/0282135 A1 | 9/2014 | Segre | |
| 2015/0135096 A1 | 5/2015 | Dhara et al. | |

OTHER PUBLICATIONS

Felznestein, Arik, "Google Play: CAllWho Smart Contacts Widget", Retrieved on: Mar. 18, 2016, Available at: https://play.google.com/store/apps/details?id=com.swarly.callwho&hl=en, 3 pages.
Komninos, et al., "The use of mobile contact list applications and a context-oriented framework to support their design", In Proceedings of 11th International Conference on Human Computer Interaction with Mobile Devices and Services, Sep. 15, 2009, 2 pages.
"Office Action Issued in European Patent Application No. 17715598.3", dated Jan. 13, 2020, 6 Pages.

* cited by examiner

PEOPLE RELEVANCE PLATFORM

CROSS-REFERENCE TO RELATED APPLICATIONS

This application claims the benefit of U.S. Provisional Application Ser. No. 62/314,383, filed Mar. 28, 2016, entitled "People Relevance Platform," which application is incorporated herein by reference in its entirety.

BACKGROUND

In light of the ever-expanding social networks of many users, various implementations of applications and services have evolved to manage user contacts and interactions therewith. Generally, these implementations organize user contacts according to one or more sets of criteria. For example, user contacts may be arranged by most recently contacted, due to a positive correlation between how recently a user contact has been contacted and the relevance of that user contact to the user. In sophisticated scenarios, this relevance is refined to be calculated using recency of contacts as well as user identity (e.g., personal versus professional accounts). However, these implementations largely exclude fundamental context clues and ignore scenarios where users operate in multiple contexts (e.g., personal and professional) on single devices using uniform accounts. As a result, relevance is often generated with insufficient user signals to accurately determine user intent or the most relevant user contacts.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Examples of the present disclosure describe systems and methods of providing a people relevance platform. In aspects, an event may be generated by an application or service on a client device of a user. The event (and aspects thereof) may be transmitted to a people relevance platform on a server device. The people relevance platform may use the event to query one or more data sources for user contacts associated with the user. The people relevance platform may generate/modify a graph or model using the user contact data, and may provide the user contact data to the client device. The client device may update a local cache and provide the user contact data to the originating application. The client device may monitor the user selection of a contact, and transmit the selection information to the people relevance platform. The people relevance platform may modify the graph and/or model based on the selection information.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
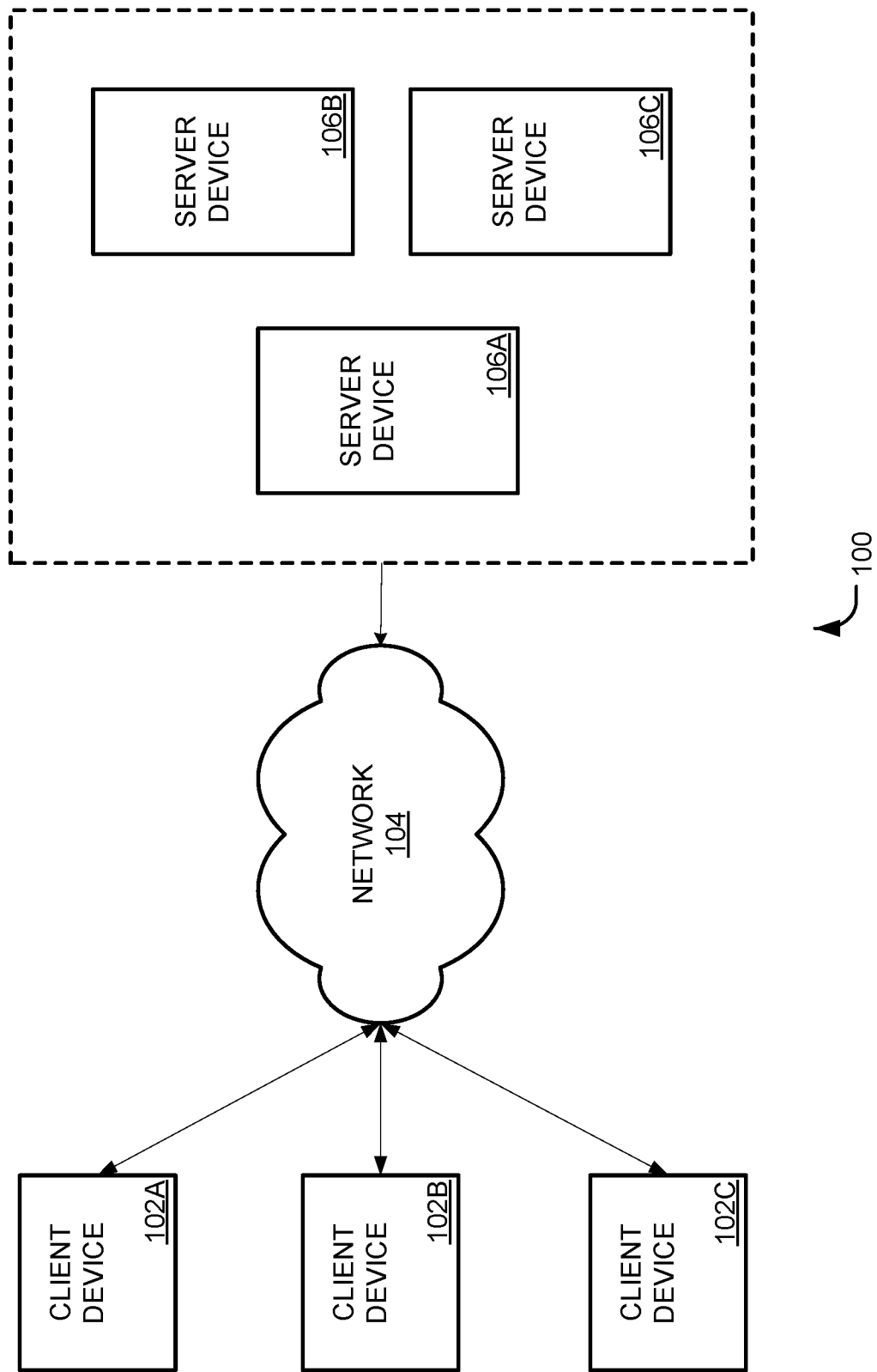
FIG. 1 illustrates an overview of an example system for implementing people relevance platform techniques as described herein.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure provides systems and methods of providing a people relevance platform. In aspects, an event may be generated by an application on a client device of a user. An event, as used herein, may refer to a notification, a request, a result set, an activity, a response, a message, etc. generated by a client device. The event may be generated in response to user input or data received from a service, application or other device. The client device may identify and/or determine relevant content associated with the event. Relevant content, as used herein, may refer to data signals related to user context data, such as user account/identity information, device information, referenced and originating applications, communication method, communication frequency, dimensional information (e.g., time and location), groups and group members, declared and implied relationships, declared importance of user contacts, etc. The client device may transmit the event and/or the relevant content to a people relevance platform on a server device. A people relevance platform, as used herein, may refer to a cross-platform infrastructure for providing the ability to algorithmically determine behavioral patterns given an array of inputs. The people relevance platform may use the event and/or the relevant content of the event to query one or more data sources for user contacts associated with the user. In examples, the data sources may include databases, settings, data files, application data, communication data, user queries, user selections, user transactions, content providers, web resources, geo-location information, date and times, etc. In at least one example, one or more of the data sources may comprise or be associated with different platforms, operating systems and/or configurations. As such, the people relevance platform may provide for cross-platform data aggregation and communication. The user contact data received from the data sources may represent various user contexts, behavioral information, and/or user intentions.

In some aspects, the people relevance platform may aggregate the user contact data received from the data sources. The aggregated user contact data may be used to generate one or more relevancy calculations for the user contacts. For example, the people relevance platform may provide the user contact data as input to a relevancy algorithm or machine-learning model. A model, as used herein, may refer to a statistical language model that may be used to determine a probability distribution over one or more word and/or character sequences and/or to predict a response value from one or more predictors. In examples, a model may be a rule-based model, a machine-learning regressor, a machine-learning classifier, a neural network, or the like. The relevancy algorithm/model may output a list of user contacts that is organized according to (or otherwise associated with) a contextual-based relevance metric. The people relevance platform may use the user contact data and/or the list of user contacts to generate or modify a social relevancy graph for the user. The social relevancy graph may illustrate data, such as relevancy calculations/rankings for user contacts, relevancy criteria, relevancy data signals, user contact trends and analysis, and the like. In at least one example, the people relevance platform may provide an interface to navigate and interact with the social relevancy graph.

In aspects, the people relevance platform may provide the generated list of user contacts to the client device. Upon receiving the list of user contacts, the client device may update a local cache comprising user contact information and/or user context data. In at least one example, the client device may transmit data (e.g., relevant content) from the local cache to the people relevance platform, as described above. The client device may provide at least a portion of the list of user contacts to the originating application. The originating application may, in turn, provide the list of user contacts to the user via an interface. The interface may be operable to enable the user to select one or more of the user contacts on the list of user contacts and/or user contacts not on the list of user contacts. The client device may monitor the user selection of user contacts from the list of user contacts and may transmit the selection information to the people relevance platform. The people relevance platform may use the selection information to modify the social relevancy graph and/or model. For example, the people relevance platform may increase the relevancy ranking of a user contact, place or adjust a weighting factor, modify relevancy criteria, record a new relationship, or the like. In some aspects, the people relevance platform may generate a graph and/or model for each application that transmits data to the people relevance platform data. In such aspects, the graphs and/or models for each application may be isolated from one another, such that modifications to one graph/model do not modify or impact a separate graph/model. In other aspects, the people relevance platform may train a single model to isolate (e.g. silo) relevance data and/or generate relevance metrics on a per-application basis.

Accordingly, the present disclosure provides a plurality of technical benefits including but not limited to: aggregating user context data; algorithmically determining behavioral patterns; improving user contact selection; accurately calculating relevancy metrics; leveraging cloud-based systems for relevancy calculations; providing multi-dimensional relevance determinations; training models to determine contact relevancy and to weight contact relevancy factors; application-level siloing of relevance data; and improving efficiency and quality for applications/services utilizing examples of the present disclosure, among other examples.

FIG. 1 illustrates an overview of an example system for providing a people relevance platform as described herein. Example system 100 presented is a combination of interdependent components that interact to form an integrated whole for providing a people relevance platform. Components of the systems may be hardware components or software implemented on and/or executed by hardware components of the systems. In examples, system 100 may include any of hardware components (e.g., used to execute/run operating system (OS)), and software components (e.g., applications, application programming interfaces (APIs), modules, virtual machines, runtime libraries, etc.) running on hardware. In one example, an example system 100 may provide an environment for software components to run, obey constraints set for operating, and makes use of resources or facilities of the system 100, where components may be software (e.g., application, program, module, etc.) running on one or more processing devices. For instance, software (e.g., applications, operational instructions, modules, etc.) may be run on a processing device such as a computer, mobile device (e.g., smartphone/phone, tablet) and/or any other electronic devices. As an example of a processing device operating environment, refer to the example operating environments depicted in FIGS. 4-7. In other examples, the components of systems disclosed herein may be spread across multiple devices. For instance, input may be entered on a client device and information may be processed or accessed from other devices in a network such as one or more server devices.

As one example, the system 100 comprises client device 102A, client device 102B, client device 102C, distributed network 104, and a distributed server environment comprising one or more servers such as server device 106A, server device 106B and server device 106C. One of skill in the art will appreciate that the scale of systems such as system 100 may vary and may include more or fewer components than those described in FIG. 1. In some examples, interfacing between components of the system 100 may occur remotely, for example, where components of system 100 may be spread across one or more devices of a distributed network.

In aspects, client devices 102A-C may be configured to receive input from user via a user interface component or other input means, such as device sensors. Examples of input may include voice, visual, touch and text input. Examples of device sensors may include a magnetic sensor, a gyroscopic sensor, an acoustic sensor, a mechanical sensor, a visual sensor, a GPS sensor and a near field communication (NFC) sensor. Client devices 102A-C may generate one or more events based, at least on part, on the received input. For example, an event may be generated in response to user input or in response to data received from a service, application or other device. Client devices 102A-C may be further configured to determine relevant content corresponding to the event. In examples, determining relevant content may comprise accessing a data store (e.g., a file, database, local cache, etc.) of user contacts and/or user contact contexts, and identifying content that is temporally and/or contextually associated with a corresponding event. Portions of the event and/or accessed data may then be transmitted to one or more server devices, such as server devices 106A-C. In at least on example, the event and/or relevant content data may be transmitted to a server device via a communication channel or an API exposed by the server device. In aspects, client devices 102A-C may be similar device types having similar configurations, different device types having different configurations, or some combination thereof. Also, each device may receive input from a single user (or user account) or a plurality of users (or user accounts). For example, a user may provide input or access content using client device 102A (e.g., a PC), client device 102B (e.g., a mobile phone) and/or client device 102C (e.g., a tablet). In such an example, client devices 102A-C may then transmit the respective events and relevant content generated/stored by each device to one or more server devices.

Server devices 106A-C may be configured to receive and process event data (e.g., events and/or relevant content associated with the events) from one or more client devices. In aspects, processing the event data may include parsing the event data to identify, for example, information identifying a user and/or client device. In at least one example, server devices 106A-C may additionally determine one or more contexts associated with the event data. In such an example, determining the contexts may include identifying and/or correlating events with corresponding dimensional information (e.g., time and location). Server devices 106A-C may use the identified information to generate one or more queries corresponding to the event and/or context data. The queries may be transmitted to one or more data stores comprising information related to the user contacts of an identified user. After receiving responses from the data stores for at least a portion of the queries, server devices 106A-C may aggregate the response data. The aggregated response data may be provided to a contextual relevancy algorithm or model to perform one or more relevancy calculations for the user contacts. The relevancy algorithm/model may output a list of user contacts that is organized according to (or otherwise associated with) a contextual-based relevance metric. Server devices 106A-C may then transmit the aggregated contact data and/or organized list of user contacts to client devices 102A-C. In some aspects, server devices 106A-C may further be configured to use at least a portion of the event data, context data and/or response data to generate/modify a social relevancy graph or a relevancy algorithm/model. For example, server devices 106A-C may use event data indicating that a user sends a user contact an average of 4 SMS messages per day to illustrate an increased relevance of a user contact. Additionally, server devices 106A-C may use this event data to increase a weighting factor for SMS communications in the relevancy model.

Client devices 102A-C may further be configured to receive context-based user contact data. In aspects, client device 102A-C may receive context-based user contact data from server devices and/or user contact data sources. Client devices 102A-C may use the context-based user contact data to update or modify a local data store comprising preexisting user contact and/or context data for the user. The context-based user contact data may be provided or made accessible to an application/service that originated the event or an application/service that is associated with the originating application/service. Client devices 102A-C may further be configured to monitor the application/server receiving the context-based user contact data for a user selection of one or more contacts in the context-based user contact data. In response to detecting the selection, the selection and/or selection data may be transmitted to a server device comprising a social relevancy graph or a relevancy algorithm/model, such as server devices 106A-C. The server device may then use the selection and/or selection data to modify the graph and/or model associated with the user and/or application accordingly.

Figure 2:
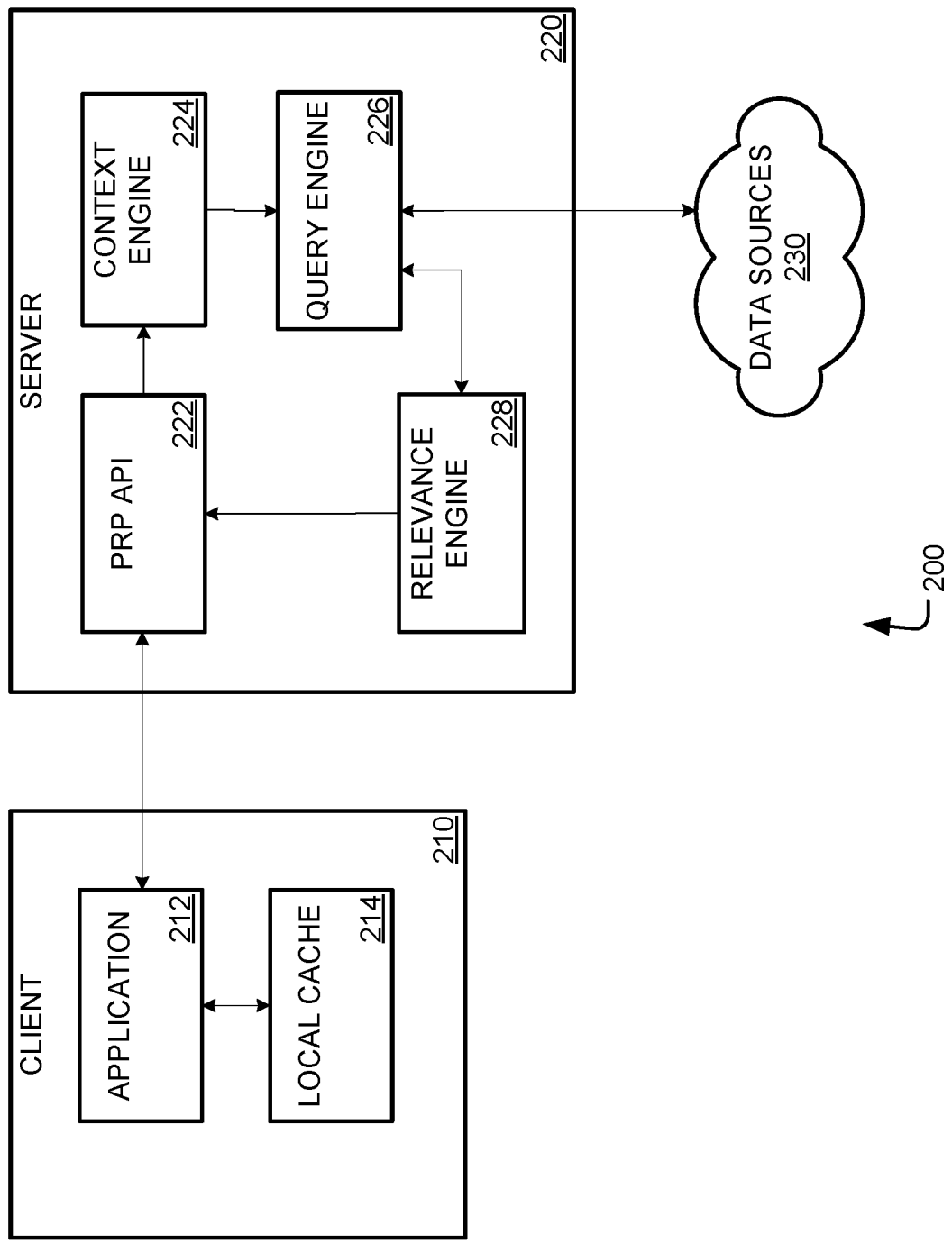
FIG. 2 illustrates an example interplay between a client device and a server device in a people relevance platform system as described herein.

FIG. 2 illustrates an overview of an example interplay between client device 210 and server device 220 people relevance platform, as described herein. The people relevance platform techniques implemented by client device 210 and/or server device 220 may comprise the people relevance platform techniques and input described in FIG. 1. In alternative examples, a single system (comprising one or more components such as processor and/or memory) may perform processing described in systems 100 and 200, respectively. Further, client device 210 and/or server device 220 may comprise a user interface component as described in the description of FIG. 1.

With respect to FIG. 2, client device 210 may comprise application 212 and local cache 214, each having one or more additional components. Application 212 may be configured to receive input and/or generate events using various sensors and/or interfaces associated with client device 210. For example, application 212 may be a photo application that generates a photo sharing event in response to using client device 210 to share, post or pin one or more photos. The photo sharing event may comprise one or more event elements. An event element, as referred herein, may provide details associated with the event, such as event metadata, dimensional data, event actions, event participants, content labels, reference applications, system/application information, user information, etc. For instance, the photo sharing event may comprise the event elements "event_action=share" and "photo_content=dogs." Application 212 may determine that the photo sharing event is to be transmitted to a people relevance platform associated with server device 220. In examples, such a determination may include identifying a listener service, component or API associated with the people relevance platform, identifying/receiving an instruction to transmit the event to the people relevance platform, or the like. In response to this determination, Application 212 may additionally add event elements "user=Will_4321," "application=PhotoNinja," and "date=Nov. 1, 2016" to the photo sharing event. Application 212 may then package and/or store the photo sharing event in a data store, such as local cache 224. Local cache 214 may be configured to store information corresponding to user contacts and/or user contexts. Local cache 214 may be used by, for example, application 212 to determine event elements to add to or remove from events, contexts to associate with events, contact relevancy information, etc. Application 212 may additionally or alternately transmit the photo sharing event to a people relevance platform via a communication channel or exposed interface.

Server device 220 may comprise people relevance platform application programming interface (PRP API) 222, context engine 224, query engine 226 and relevance engine 228. PRP API 222 may be configured to receive event data from one or more devices, such as client device 210. In aspects, PRP API 222 may expose a communication means (e.g., an interface or a listener component) to client devices.

The communication means may enable client devices to provide information (e.g., user data, user contact data, data signals and event data) to PRP API 222 using, for example, one or more "POST" calls (or the functional equivalent). Additionally or alternately, the communication means may enable PRP API 222 to solicit such information from client devices using, for example, one or more "GET" calls (or the functional equivalent). In at least one aspect, PRP API 222 may provide for authenticating the client device or application transmitting data to PRP API 222. PRP API 222 may also provide an interface that enables first- and third-party developers to access, query and/or modify various aspects of PRP API 222. After receiving the above-described information from one or more client devices, PRP API 222 may provide the information to one or more components of server device 220, such as context engine 224.

Context engine 224 may be configured to process received event data. In aspects, processing event data may include parsing the parse event data to identify user data, device data, contextual information, and the like. As an example, context engine 224 may use a pattern matching techniques and/or a parsing utility to identify the user, application and/or device that originated an event. The identified event information may then be used to determine one or more contexts for the action and/or event. Examples of contexts may include account/identity information, device information, referenced and originating applications, event communication method(s), communication frequency, dimensional information (e.g., time and location), group memberships and group members, declared and implied relationships, declared importance of user contacts, etc. In examples, determining the contexts may include using one or more rule sets, pattern matching techniques or machine learning models to identify relationships and associations for an event. Based on the determined contexts, context engine 224 may add one or more event elements to the event. For example, context engine 224 may access information or otherwise determine that, when user "Will_4321" takes a picture of a dog, the user is at a particular location (e.g., at home or at a dog park). In response to this determination, context engine 224 may add the event element "location=home" (or "location=dog park") to the photo sharing event. Context engine 224 may then provide the event data to a search utility, such as query engine 226.

Query engine 226 may be configured to generate queries for received events. In aspects, query engine 226 may use an event or event data to determine data sources to query. In at least one example, the determination may comprise using pattern matching to compare one or more terms in the event elements to data in one or more data sources. For instance, user "Will_4321" may use a photo management application to share an image of his dog with his "Dog Lovers" group. Query engine 226 may use features of the event data (e.g., user ID, file extension, group name, etc.) to determine that the user is associated with a "My Pictures" directory and "My Groups" directory. Accordingly, query engine 226 may mark the two directories are potential data sources. In another example, the determination may comprise using a data store of previous user queries to identify relevant data sources. For instance, query engine 226 may analyze a query log of previous queries for the user. One or more data sources identified by the query log may then be marked as potential data sources. In yet another example, the determination may comprise using a statistical model to identify domains associated with the event and/or action. In some aspects, query engine 226 may generate at least one query for each identified data source. In other aspects, query engine 226 may generate and submit a single query to a search utility. The search utility may disaggregate the query into a plurality of sub-queries. Query engine 226 may be further configured to transmit the generated queries to one or more identified data sources, such as data sources 230. Data sources 230 may include databases, user/system settings, data files, application data, content providers, web resources, communication data, user queries, user selection data, user transaction data, geo-location information, etc. In examples, data sources 230 may generate one or more responses for each received query. The responses may comprise information associated with user contacts for a user. For instance, the responses may comprise lists of user contacts. The generated responses may be provided to (or accessible to) query engine 226.

Relevance engine 228 may be configured to determine a relevance metric for one or more user contacts. In aspects, relevance engine 228 may receive (or otherwise have access to) the response data generated using data sources 230. Relevance engine 228 may aggregate the response data and derive one or more context signals from the response data. The context signals may be used to calculate a relevancy score or ranking for one or user contacts of the list of user contacts. For example, in response to a query corresponding to the event element "photo_content=dogs", query engine 226 may receive several contacts that are typically associated with dog photos. In a particular example, the contacts may be associated with a "Dog Lovers" distribution list established by the user, and a list of contacts in which communications with the term "dog" were sent to and/or received by a user. Relevance engine 228 may aggregate the contacts and identity a count of occurrences and/or contexts for each of the aggregated contacts. Based on the counts, relevance engine 228 may determine an order of relevance among the aggregated contacts. The determination may include the use of, for example, fuzzy logic, one or more rule sets and/or a machine-learned model. In a particular example, several relevance factors may be analyzed during the determination, such as recency on communication, frequency of communication, 1-dimensional contextual relevance, pinning of a user, shared room experience, explicit declaration of relevance, adding a user to a group, N-dimensional contextual relevance, etc. Each of these factors may be weighted or assigned importance values. One or more of the importance values may then be used to calculate a relevance score.

In some aspects, relevance engine 228 may use one or more relevancy factors, importance values, and/or relevancy scores to generate or modify a graph representing the user contacts, contexts and/or various dimensions for a user or client device. Additionally or alternately, relevance engine 228 may provide such information as input to a statistical model. In examples, one or more of the graph and statistical model may be used by server device 220 and/or one or more users to determine contextual-based relevancy of user contacts. In a particular example, one or more graphs and/or statistical models may be generated for each application/service providing signal data to PRP API 222. In such an example, the graphs/models may be siloed, such that the relevancy data from one application/service may not interfere or be otherwise accessible to a separate application/service. Relevance engine 228 may be further configured to provide contextual relevance determinations that are output from the statistical model or determined using the graph to PRP API 222. PRP API 222 may then provide the user contacts, user contact groups and/or relevance determinations to client device 210.

Client device 210 may further be configured to receive user contact data from server device 220. In aspects, client device 210 may use received contextually relevant user contact data received from PRP API 222 to update local contact and/or relevancy information on client device 210. For example, client device 210 may use received user contacts and relevance determinations to update a local cache, such as local cache 214, comprising user contact data, user context data, user contact context data, and the like. In such an example, prior to receiving the relevance determinations described above, the local cache may comprise user contacts and relevance information that are only based on the recency and/or frequency of user communications. Client device 210 may also provide the received user contacts and relevance determinations to application 212. Application 212 may provide the contextually relevant user contact data to a user via an interface accessible to application 212. In a particular example, application 212 may access local cache 214 to determine a subset of user contacts to present to the user or an order to display the user contacts presented to the user. In aspects, after presenting a list of suggested user contacts to a user, application 212 may receive a user selection from the presented user contacts. The user selection may include or represent an indication of one or more selected user contacts, the position within a list of the selected user contacts, and/or user contact data associated with selected user contact. Application 212 may provide the user selection to one or more of client device 210 and PRP API 222. Alternately, client device 210 may be configured to monitor application 212 for the user selection. Upon detecting a user selection, client device 210 may cause the user selection data to be transmitted to PRP API 222.

Server device 220 may be further configured to receive user selection data from client device 210. In aspects, server device 220 may provide received user selection data to relevance engine 228. Relevance engine 228 may be further configured to use the user selection data to modify the graph and/or model associated with the user, service and/or application. For example, the user selection data may be used as input to a social relevance model associated with a photo application to modify the relevance of one or more user contacts in various contexts. In such an example, the user selection data may be used to train the social relevance model that, when a photo of a dog is shared, user contacts on the "Dog Lovers" distribution list are more relevant than contacts that simply included the term "dog" in an email. Accordingly, the social relevance model may provide (or cause to be provided) a list of user contacts where the user contacts on the "Dog Lovers" distribution list are present and/or prioritized. The list of user contact may then be provided to the photo application.

Figure 3:
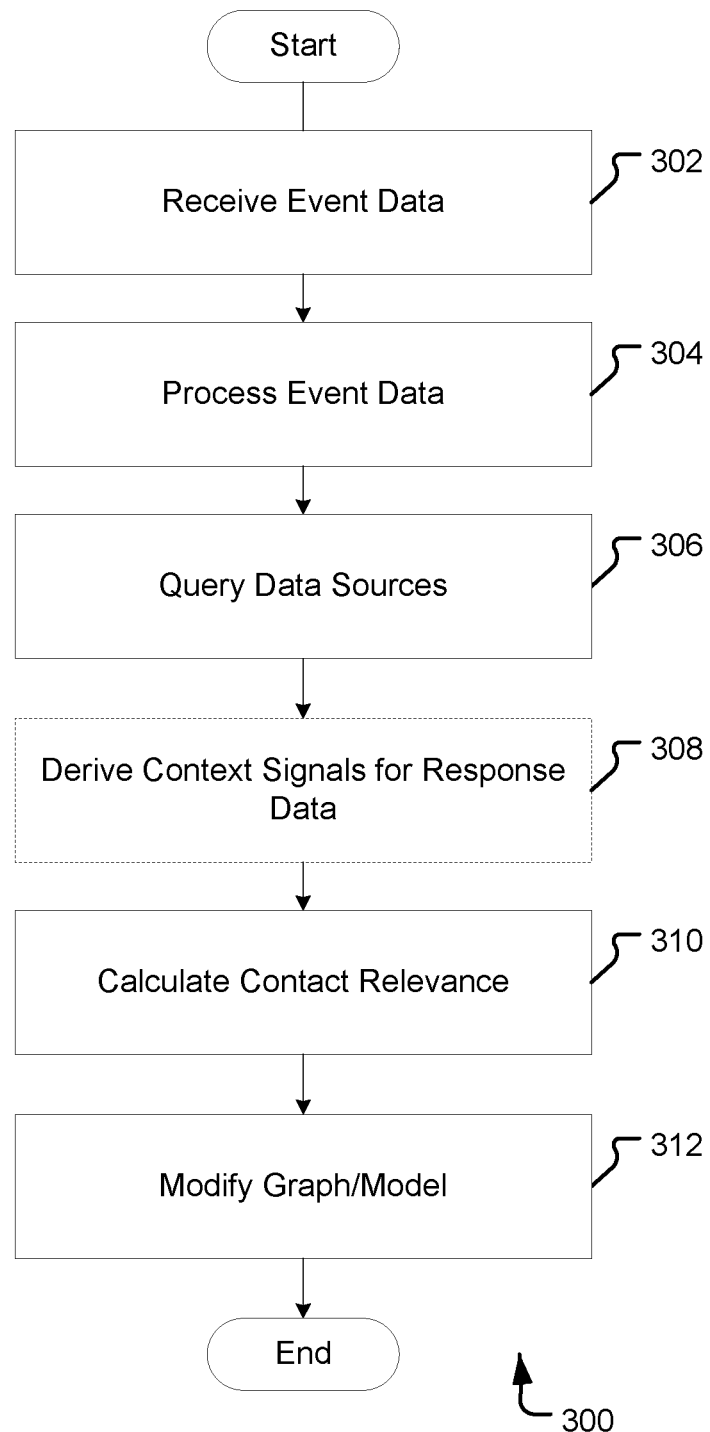
FIG. 3 illustrates an example method of determining contact relevancy in a people relevance platform as described herein.

FIG. 3 illustrates example method of determining contact relevancy in a people relevance platform as described herein. In aspects, method 300 may be executed by an example system such as system 100 of FIG. 1. In examples, method 300 may be executed on a device comprising at least one processor configured to store and execute operations, programs or instructions. However, the method 300 is not limited to such examples. In other examples, method 300 may be performed on an application or service for providing query resolution. In at least one example, method 300 may be executed (e.g., computer-implemented operations) by one or more components of a distributed network, for instance, a web service/distributed network service (e.g. cloud service) to leverage determining contact relevancy in a people relevance platform.

Example method 300 begins at operation 302 where an event may be received by a client device. In aspects, a client device (such as client device 210) may receive and/or generate an event in response to receiving input from, for example, a user, an application, a service, or a separate device. The event may refer to a notification, a result set, an activity, a response, a message or the like. In examples, a client device may identify and store the event (or aspects thereof) in a local data store, such as local cache 214. For example, a user may access an SMS application on a client device to send a text message. The application and/or client device may identify the creation of a "texting" event. Prior to entering any information into the text message, the application and/or client device may also identify contextual information for the texting event using a rule set, pattern matching or decision logic. The contextual information may include the GPS coordinates of the client device, the time of day the texting event was generated, and the name of the application used to generate the text message. At least a portion of the texting event and the corresponding contextual information may be stored in a local cache. In some aspects, the client device may have access to a communication channel or an interface to one or more servers, such as server 220, comprising a people relevance platform, such as PRP API 222. The application and/or client device may use the communication channel/interface to provide at least a portion of the event data (e.g., the texting event and the corresponding contextual information) to the people relevance platform.

At operation 304, received event data may be processed. In aspects, the people relevance platform may receive event data from one or more devices. The people relevance platform may provide the event data to a contextual analysis component, such as context engine 224. The contextual analysis component may be configured to parse received event data to determine information identifying the user and/or device that originated the event. The identified user and/or device information may be used to determine one or more contexts for the action and/or event. Based on the determined contexts, the contextual analysis and/or generation component may add, remove and/or modify one or more event elements in an event. For example, in the above texting event example, the contextual analysis component may parse the event data to determine the GPS coordinates of the client device. The GPS coordinates may then be used to determine whether the geolocation corresponds to known or frequently visited location (e.g., work, home, etc.). If the location is determined to be known or frequently visited, a corresponding label (e.g., "work") may be added as an element of the event data (e.g., "location=work"). As another example, the contextual analysis component may access a calendaring application/service to determine the current day and date. The determined day and/or date may be added as an element of the event data (e.g., "day=weekday").

At operation 306, data sources may be queried. In aspects, the people relevance platform may use event data to generate one or more queries for data sources associated with the user contacts of a user. The queries may be formulated and/or generated using a query analysis component, such as query engine 226. The query analysis component may determine data sources to query using, for example, pattern matching to compare one or more terms in the event data elements to data in one or more data sources. For example, the query analysis component may analyze the texting event data described above to identify the terms therein. Such terms may include the username/account ID of the user, the device used to generate the event, the type of communication method being used (e.g., SMS), communication topics, proper nouns, unique/rare keywords, user contact information, etc. Based on this information, one or more data sources may be identified. For instance, the query analysis component may identify one or more user profiles, a transaction/event data stores for the client device, and a SMS transactions data store. As a result, the query analysis component may generate one or more queries for the user profiles, a user contact database, the device transaction/event logs and the SMS data store for the user. The queries may be submitted directly to the data stores or to an intermediate search utility.

At operation 308, contextual signals may be derived from response data. In aspects, the people relevance platform may receive response data from the queries submitted to the data sources. The response data may comprise user contacts and user context data. The people relevance platform may aggregate the user contacts in the response data using a relevance determination component, such as relevance engine 228. One or more contextual signals may be derived from the aggregated data. In examples, deriving contextual signals may include using, for example, machine learning techniques to analyze the aggregated data to determine behavioral patterns and/or contextual relationships for a user. For example, with respect to the above texting event, the following information may be derived from the response data: 1) On work days, usually around 5 pm, the user texts his wife (Jill) from his mobile phone to let her know the user is on the way home; 2) Occasionally, the user texts his friend (Matt) to make plans after work; and 3) Typically, when the user texts his friend (Matt), the user also texts his wife (Jill) to let her know he will be late. Based on this information, the people relevance platform may derive contextual signals for the communication method (e.g., text messaging), dimensional relativity (e.g., time: ~5 pm, weekdays; location: leaving work), device (e.g., mobile phone), frequency (e.g., most often: Jill; second most: Matt), pinning/favoriting (e.g., pinned Jill to "favorites;" pinned Matt to "friends"), and explicit declaration of importance (e.g., designated Jill as "wife" and added her to "Family" on mobile phone). In aspects, the derived contextual signals may be used to compile a list of user contacts. For example, the user contacts Jill and Matt may be added to a list of user contacts that may be suggested for the texting event.

At operation 310, relevancy metrics may be calculated for the user contacts. In aspects, the people relevance platform may use the derived contextual signals to determine and rank/weight user contacts and/or contexts in the response data. In examples, determining a rank/weight may comprise applying one or more rule sets or search algorithms (such as, hill climbing algorithms, gradient ascent algorithms, the greedy algorithms, etc.) to the derived contextual signals and/or response data. For example, with respect to the above texting event example, the people relevance platform may analyze and/or score the user contacts in one or more contextual signal category. In the frequency category, Jill may receive a score of 0.9 for being the most frequently contacted user contact, whereas Matt may receive a score of 0.6 for being the second most frequently contacted user contact. In the declared importance category of pinning/favoriting, Jill may receive a score of 0.9 for being pinned to the "favorites" group (the highest rated user contact group), whereas Matt may receive a score of 0.4 for being pinned to the "friends" group (the third highest rated user contact group). In the explicit declared importance category, Jill may receive a score of 0.7 for being specifically designated as "wife" (a category in the second highest rated user contact group, "family"). In the dimensional relativity category, Jill may receive a score of 0.6, as the user initiated the text message at 5:15 pm from his work office, whereas Matt may receive a score of 0.2. Moreover, the people relevance platform may determine or otherwise identify that one or more of the contextual signal categories is a more accurate predictors of preferred (or likely) user contacts. For instance, the declared importance category and frequency category may be respectively identified as the first and second most accurate predictors. As a result, a multiplier of 2.0 may be applied to the declared importance categories and a multiplier of 1.5 may be applied to the frequency category.

In aspects, after the one or more of the categories has been analyzed and/or scored, a scoring algorithm may be applied to the scored data. In a particular example, the algorithm may add the scores of each contextual signal category for each user contact, and multiple any applicable weights. As an example, Jill's overall user contact relevancy score may be calculated as (1.5*0.9)+(2.0*0.9)+(2.0*0.7)+0.6=5.15, whereas Matt's overall user contact relevancy score may be calculated as (1.5*0.6)+(2.0*0.4)+0.2=1.90. Based at least on the contact relevancy scores, a list of user contacts may be organized or ranked. In some aspects, the contact relevancy scores and/or user contacts rankings may be modified in response to modifying the event or aspects of the event data. For example, with respect to the above texting event, in response to a user entering a portion of a user contact name (e.g. "J") into the "To:" field of the text message, the application and/or client device may provide the entered text (and associated context data) to the people relevance platform using the communication channel/interface described above. Based on the received text, the people relevance platform may cause additional queries to be generated and supplied to the data sources. For instance, user contact data for the user contacts "Jill," "Jim" and "Joe" may be provided in the response data. Alternately, the people relevance platform may modify the response data and/or user contact list to remove (or reduce the rankings of) one or more user contacts. For instance, Matt (and any other user contact not beginning with "J") may simply be removed from the list of user contacts. In aspects, the people relevance platform may make one or more versions of the ranked user contact list available to one or more devices, such as client device 210. For example, the people relevance platform may provide user contacts to a client device as part of an Autosuggest or Autocomplete utility.

At optional operation 312, a relevancy graph may be generated or modified. In aspects, the people relevance platform may comprise one or more social relevancy graphs. Social relevancy graphs may illustrate the relevance (or perceived relevance) of user contacts in various contexts, and provide for visual pattern detection. In examples, social relevancy graphs may be generated or modified using user feedback, event data, derived contextual signals and/or contact relevancy scores. Generating/modifying a social relevancy graph may include providing event data, derived contextual signals and/or relevancy scores to one or more statistical or predictive models. The model(s) may then output graphical contextual user contact data. For example, the people relevance platform may receive user selection data from a client device. The user selection data may comprise a selection or ranking of one or more user contacts for a particular application. The people relevance platform may provide the user selection data to a statistical modeling engine. The statistical modeling engine may be configured to generate and/or modify one or more contextual contact graphs for a user-application pair. The statistical modeling engine may use the user selection data to modify one or more relevancy ratings and/or contextual patterns for the application.

FIGS. 4-7 and the associated descriptions provide a discussion of a variety of operating environments in which aspects of the disclosure may be practiced. However, the devices and systems illustrated and discussed with respect to FIGS. 4-7 are for purposes of example and illustration and are not limiting of a vast number of computing device configurations that may be utilized for practicing aspects of the disclosure, described herein.

Figure 4:
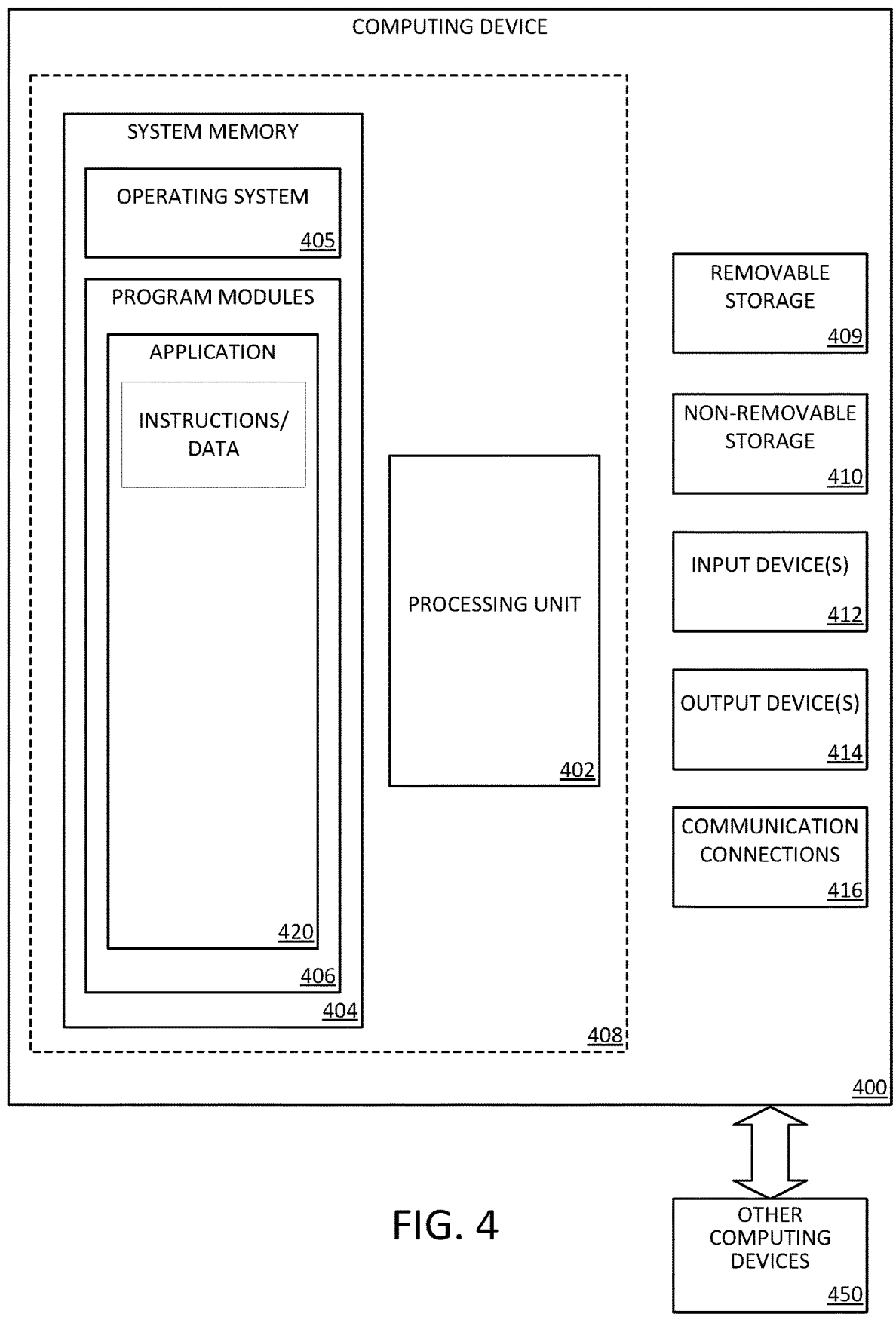
FIG. 4 is a block diagram illustrating example physical components of a computing device with which aspects of the disclosure may be practiced.

FIG. 4 is a block diagram illustrating physical components (e.g., hardware) of a computing device 400 with which aspects of the disclosure may be practiced. The computing device components described below may be suitable for the computing devices described above, including the client computing devices 102A-C and the server computing devices 106A-C. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories. The system memory 404 may include an operating system 405 and one or more program modules 406 suitable for running software application 420, such as one or more components supported by the systems described herein. As examples, system memory 404 may store people relevance platform data (e.g., user feedback, event data, derived contextual signals, contact relevancy scores, etc.) and instructions for executing a people relevance platform. The operating system 405, for example, may be suitable for controlling the operation of the computing device 400. Furthermore, embodiments of the disclosure may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 (e.g., application 420) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 400 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 400 may also have one or more input device(s) 412 such as a keyboard, a mouse, a pen, a sound or voice input device, a touch or swipe input device, etc. The output device(s) 414 such as a display, speakers, a printer, etc. may also be included. The aforementioned devices are examples and others may be used. The computing device 400 may include one or more communication connections 416 allowing communications with other computing devices 450. Examples of suitable communication connections 416 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 5A:
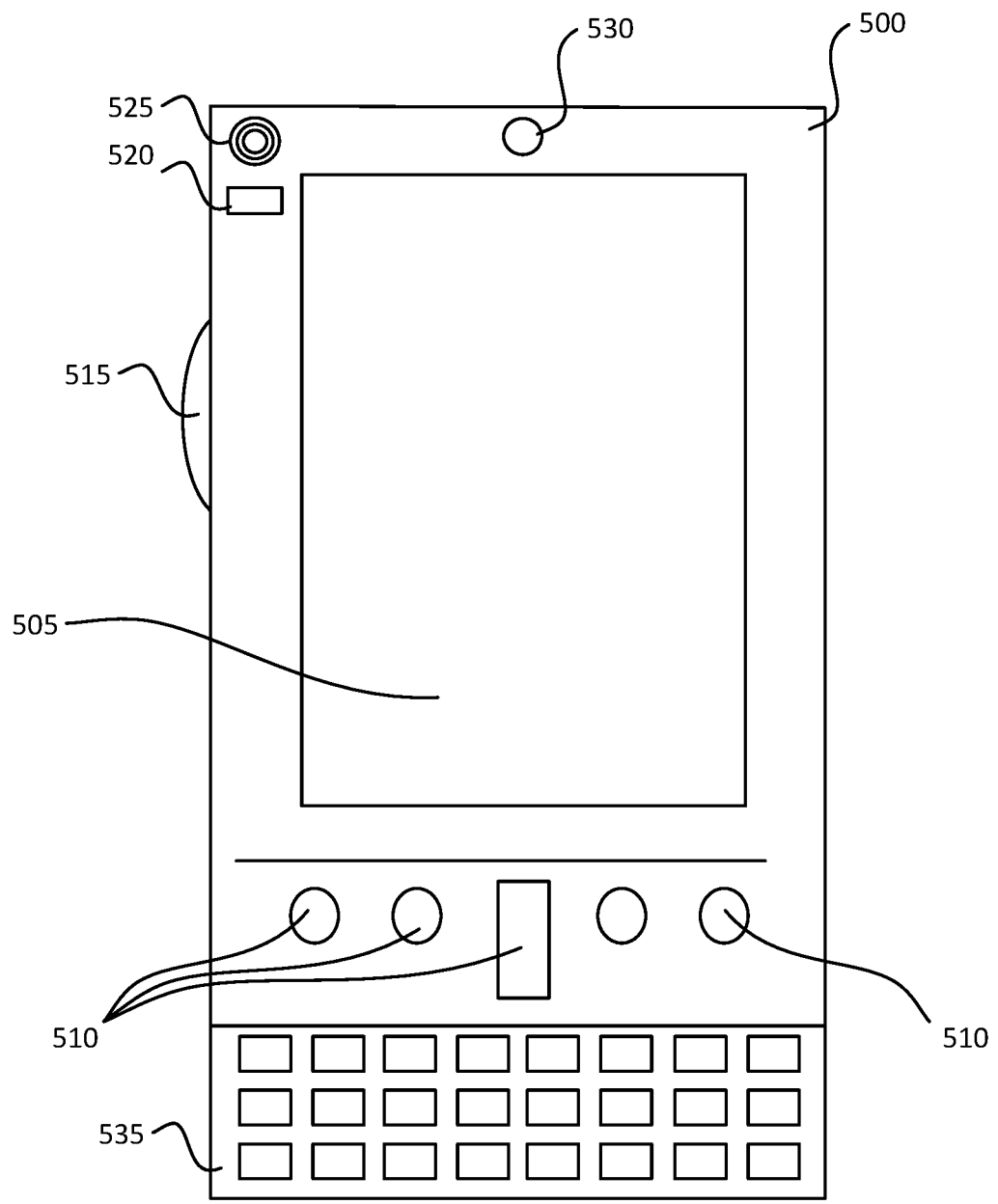
FIGS. 5A and 5B are simplified block diagrams of a mobile computing device with which aspects of the present disclosure may be practiced.
Figure 5B:
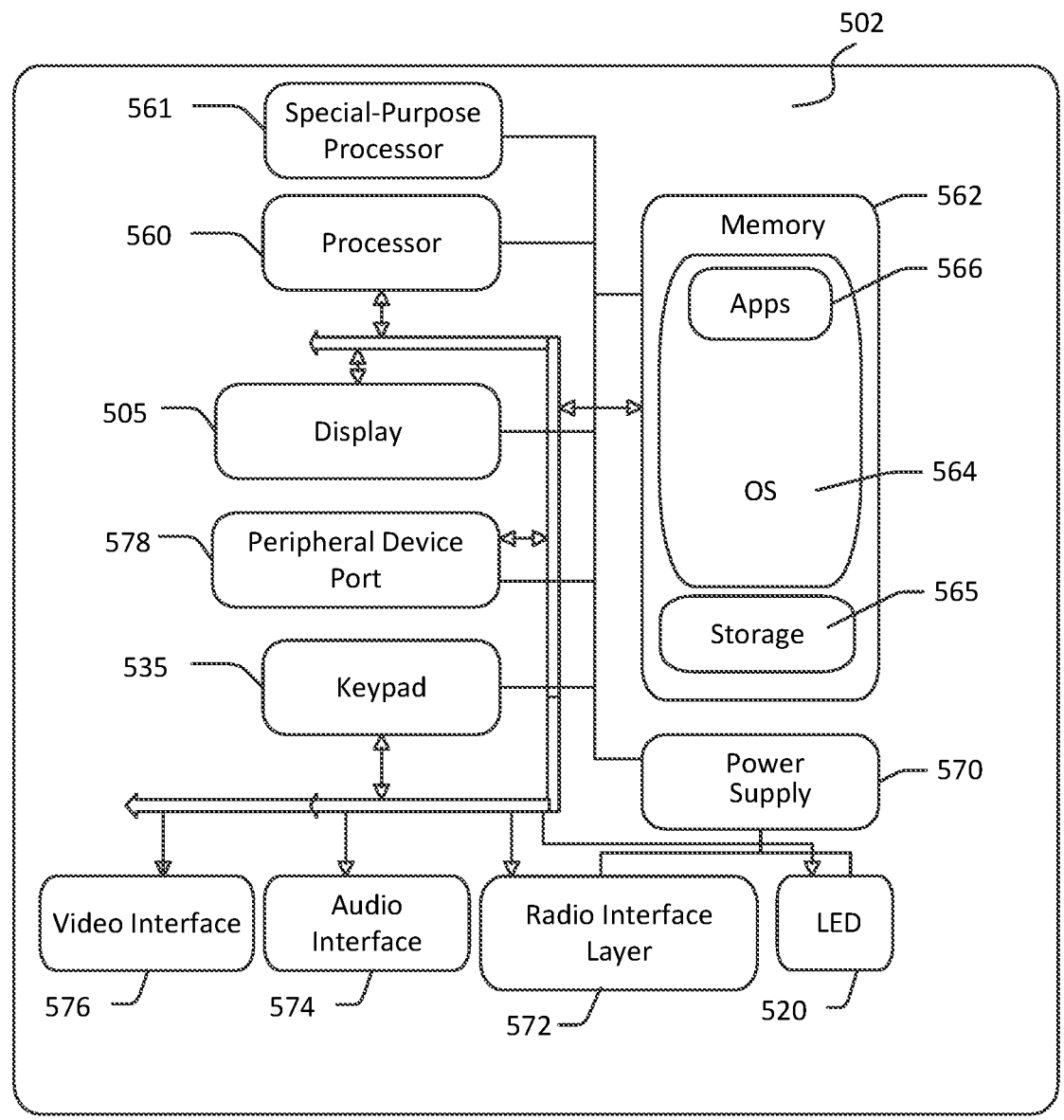

FIGS. 5A and 5B illustrate a mobile computing device 500, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 5A, one aspect of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative aspects, mobile computing device 500 may incorporate more or less input elements. For example, the display 505 may not be a touch screen in some embodiments. In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display. In various embodiments, the output elements include the display 505 for showing a graphical user interface (GUI), a visual indicator 520 (e.g., a light emitting diode), and/or an audio transducer 525 (e.g., a speaker). In some aspects, the mobile computing device 500 incorporates a vibration transducer for providing the user with tactile feedback. In yet another aspect, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one aspect of a mobile computing device. That is, the mobile computing device 500 can incorporate a system (e.g., an architecture) 502 to implement some aspects. In one embodiment, the system 502 is implemented as a "smart phone" capable of running one or more applications (e.g., browser, e-mail, calendaring, contact managers, messaging clients, games, and media clients/players). In some aspects, the system 502 is integrated as a computing device, such as an integrated personal digital assistant (PDA) and wireless phone.

One or more application programs 566 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 565 within the memory 562. The non-volatile storage area 565 may be used to store persistent information that should not be lost if the system 502 is powered down. The application programs 566 may use and store information in the non-volatile storage area 565, such as e-mail or other messages used by an e-mail application, and the like. A synchronization application (not shown) also resides on the system 502 and is programmed to interact with a corresponding synchronization application resident on a host computer to keep the information stored in the non-volatile storage area 565 synchronized with corresponding information stored at the host computer. As should be appreciated, other applications may be loaded into the memory 562 and run on the mobile computing device 500, including the instructions for providing a unified messaging platform as described herein (e.g., search engine, extractor module, relevancy ranking module, answer scoring module, etc.).

The system 502 has a power supply 570, which may be implemented as one or more batteries. The power supply 570 might further include an external power source, such as an AC adapter or a powered docking cradle that supplements or recharges the batteries.

The system 502 may also include a radio interface layer 572 that performs the function of transmitting and receiving radio frequency communications. The radio interface layer 572 facilitates wireless connectivity between the system 502 and the "outside world," via a communications carrier or service provider. Transmissions to and from the radio interface layer 572 are conducted under control of the operating system 564. In other words, communications received by the radio interface layer 572 may be disseminated to the application programs 566 via the operating system 564, and vice versa.

The visual indicator 520 may be used to provide visual notifications, and/or an audio interface 574 may be used for producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor(s) (e.g., processor 560 and/or special-purpose processor 561) and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present disclosure, the microphone may also serve as an audio sensor to facilitate control of notifications, as will be described below. The system 502 may further include a video interface 576 that enables an operation of an on-board camera 530 to record still images, video stream, and the like. The system 502 may further still include a peripheral device port 578 that enables the coupling of a peripheral device, such as a mouse, a keyboard, a monitor, a printer, an external storage device, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 565.

Data/information generated or captured by the mobile computing device 500 and stored via the system 502 may be stored locally on the mobile computing device 500, as described above, or the data may be stored on any number of storage media that may be accessed by the device via the radio interface layer 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio interface layer 572 or via a distributed computing network. Similarly, such data/information may be readily transferred between computing devices for storage and use according to well-known data/information transfer and storage means, including electronic mail and collaborative data/information sharing systems.

Figure 6:
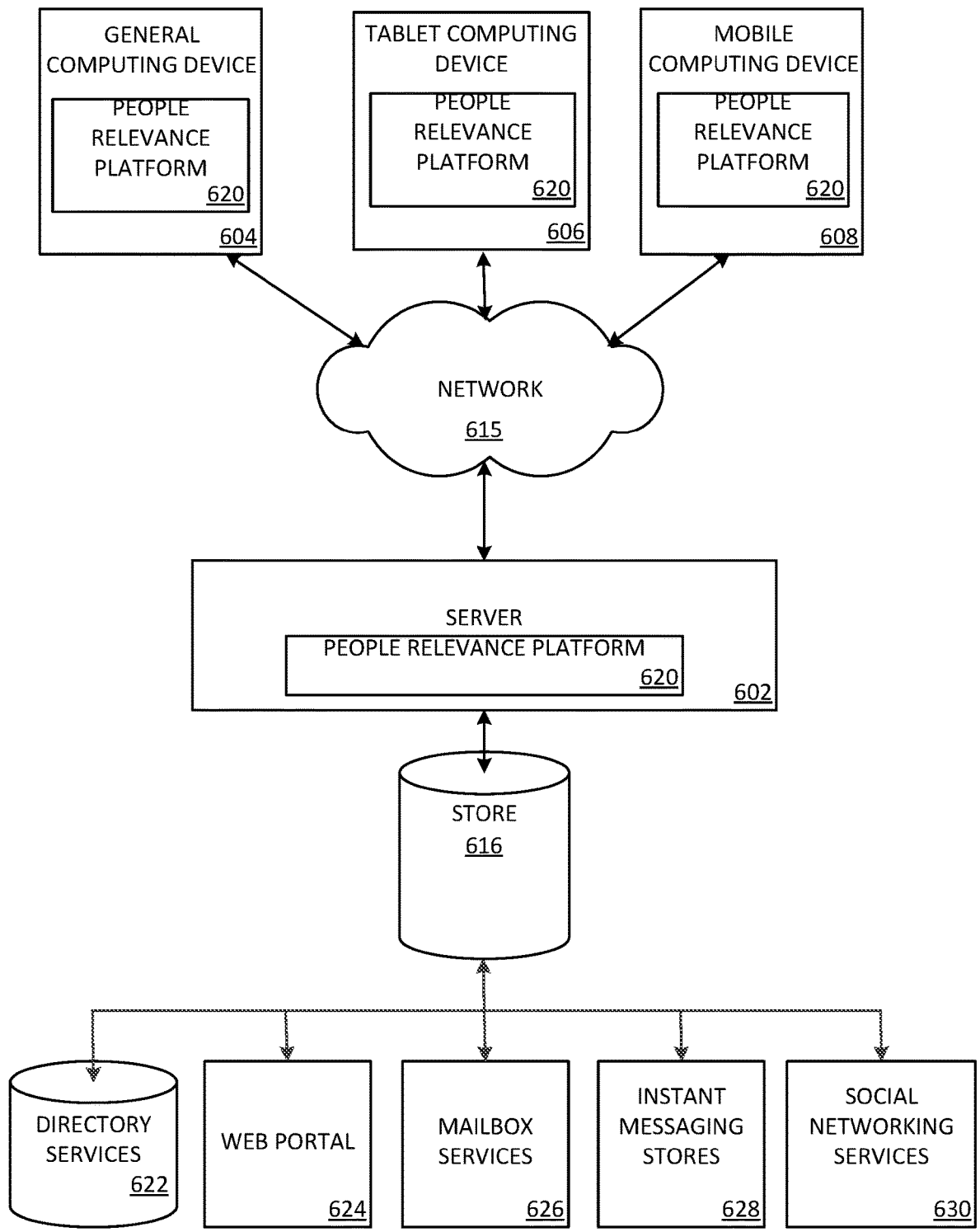
FIG. 6 is a simplified block diagram of a distributed computing system in which aspects of the present disclosure may be practiced.

FIG. 6 illustrates one aspect of the architecture of a system for processing data received at a computing system from a remote source, such as a personal computer 604, tablet computing device 606, or mobile computing device 608, as described above. Content displayed at server device 602 may be stored in different communication channels or other storage types. For example, various documents may be stored using a directory service 622, a web portal 624, a mailbox service 626, an instant messaging store 628, or a social networking site 630. The person relevance platform 620 may be employed by a client that communicates with server device 602, and/or the person relevance platform 620 may be employed by server device 602. The server device 602 may provide data to and from a client computing device such as a personal computer 604, a tablet computing device 606 and/or a mobile computing device 608 (e.g., a smart phone) through a network 615. By way of example, the computer system described above with respect to FIGS. 1-2 may be embodied in a personal computer 604, a tablet computing device 606 and/or a mobile computing device 608 (e.g., a smart phone). Any of these embodiments of the computing devices may obtain content from the store 616, in addition to receiving graphical data useable to be either pre-processed at a graphic-originating system, or post-processed at a receiving computing system.

Figure 7:
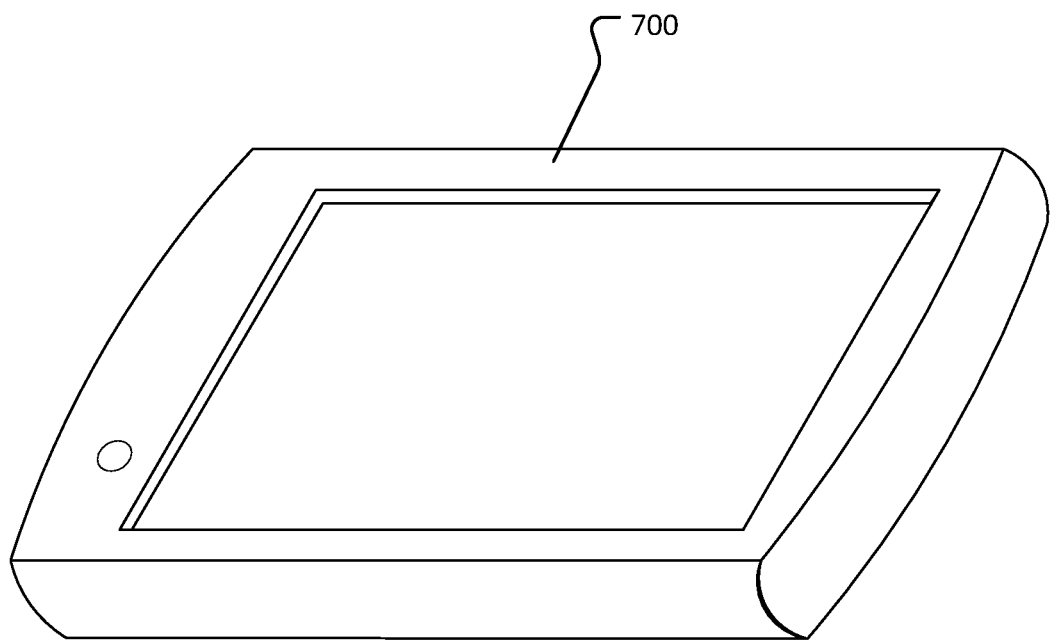
FIG. 7 illustrates a tablet computing device for executing one or more aspects of the present disclosure.

FIG. 7 illustrates an example tablet computing device 700 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory coupled to the at least one processor, the memory comprising computer executable instructions that, when executed by the at least one processor, performs a method for determining user contact relevancy, the method comprising:
      receiving event data from a client device of a user;
      processing the event data to determine information identifying the user;
      generating one or more queries based on the information identifying the user;
      providing the one or more queries to one or more data sources, the one or more data sources comprising user contact data for the user;
      receiving response data from the one or more data sources;
      deriving, from the response data, one or more context signals indicating one or more behavioral patterns of the user, wherein the one or more context signals are based on at least one of: a current location of the user, a time of day, or a message topic;
      using the one or more context signals to calculate one or more user contact relevance metrics;
      providing a user contact list based on the one or more user contact relevance metrics; and
      generating one or more relevancy graphs using at least one of the response data, the one or more context signals, and the one or more user contact relevance metrics, wherein the one or more relevancy graphs represents a relevance of one or more user contacts in one or more contexts.

2. The system of claim 1, wherein processing the event data comprises:
   using the information identifying the user to determine the one or more contexts for the event data; and
   associating the one or more contexts with the event data.

3. The system of claim 1, wherein generating the one or more queries comprises:
   identifying one or more terms in the event data; and
   wherein providing the one or more queries to one or more data sources comprises:
      comparing the one or more terms to a set of terms in the one or more data sources; and
      when a term in the one or more terms is identified in the set of terms, using the term to query the one or more data sources comprising the set of terms.

4. The system of claim 1, wherein the response data comprises at least one of: user contacts and user context data.

5. The system of claim 1, wherein deriving the one or more context signals comprises using machine learning to identify at least one of the one or more behavioral patterns of the user or contextual relationships for the user.

6. The system of claim 1, wherein calculating the one or more user contact relevance metrics comprises applying a relevancy algorithm to the one or more context signals.

7. The system of claim 6, wherein the relevancy algorithm applies a relevancy metric to one or more user contacts in the response data, wherein the relevancy metric represents at least one of a rank, a score or a weight.

8. The system of claim 7, wherein the one or more user contacts in the response data are organized according to the relevancy metric to generate the user contact list.

9. The system of claim 1, wherein providing a user contact list comprises:
    transmitting the user contact list to the client device; and
    monitoring the client device for selection data for one or more user contacts in the user contact list, wherein the selection data comprises at least one of a user selection, an indication, or a ranking.

10. The system of claim 1, the method further comprising receiving user selection data from the client device, wherein the user selection data comprises at least one of a selection or a ranking of user contacts.

11. The system of claim 10, wherein the one or more relevancy graphs are updated using the user selection data.

12. The system of claim 1, wherein each of the one or more relevancy graphs is generated for a separate application associated with the user, such that updating relevancy data in one of the one or more relevancy graphs does not modify relevancy data in another of the one or more relevancy graphs.

13. A method for determining user contact relevancy, the method comprising:
    receiving event data from a client device of a user;
    processing the event data to determine information identifying the user;
    generating one or more queries based on the information identifying the user;
    providing the one or more queries to one or more data sources, the one or more data sources comprising user contact data for the user;
    receiving response data from the one or more data sources;
    deriving, from the response data, one or more context signals indicating one or more behavioral patterns of the user, wherein the one or more context signals are based on at least one of: a current location of the user, a time of day, or a message topic;
    using the one or more context signals to calculate one or more user contact relevance metrics;
    providing a user contact list based on the one or more user contact relevance metrics; and
    generating one or more relevancy graphs using at least one of the response data, the one or more context signals, and the one or more user contact relevance metrics, wherein the one or more relevancy graphs represents a relevance of one or more user contacts in one or more contexts.

14. The method of claim 13, wherein processing the event data comprises:
    using the information identifying the user to determine the one or more contexts for the event data; and
    associating the one or more contexts with the event data.

15. The method of claim 13, wherein generating the one or more queries comprises:
    identifying one or more terms in the event data; and
    wherein providing the one or more queries to one or more data sources comprises:
    comparing the one or more terms to a set of terms in the one or more data sources; and
    when a term in the one or more terms is identified in the set of terms, using the term to query the one or more data sources comprising the set of terms.

16. The method of claim 13, wherein deriving the one or more context signals comprises using machine learning to identify at least one of the one or more behavioral patterns of the user or contextual relationships for the user.

17. The method of claim 13, wherein calculating the one or more user contact relevance metrics comprises applying a relevancy algorithm to the one or more context signals.

18. The method of claim 17, wherein the relevancy algorithm applies a relevancy metric to one or more user contacts in the response data, the relevancy metric representing at least one of a rank, a score or a weight.

19. A computer storage device encoding computer executable instructions that, when executed by at least one processor, perform a method for determining user contact relevancy, the method comprising:
    receiving event data from a client device of a user;
    processing the event data to determine information identifying the user;
    generating one or more queries based on the information identifying the user;
    providing the one or more queries to one or more data sources, the one or more data sources comprising user contact data for the user;
    receiving response data from the one or more data sources;
    deriving, from the response data, one or more context signals indicating one or more behavioral patterns of the user, wherein the one or more context signals are based on at least one of: a current location of the user, a time of day, or a message topic;
    using the one or more context signals to calculate one or more user contact relevance metrics;
    providing a user contact list based on the one or more user contact relevance metrics; and
    generating one or more relevancy graphs using at least one of the response data, the one or more context signals, and the one or more user contact relevance metrics, wherein the one or more relevancy graphs represents a relevance of one or more user contacts in one or more contexts.

20. The computer storage device of claim 19, the one or more user contact relevance metrics are ranked or weighted using a rule set or search algorithm.

* * * * *